Dec. 16, 1930.   C. L. ROCQUIN   1,784,947
RAKE
Filed Dec. 20, 1927
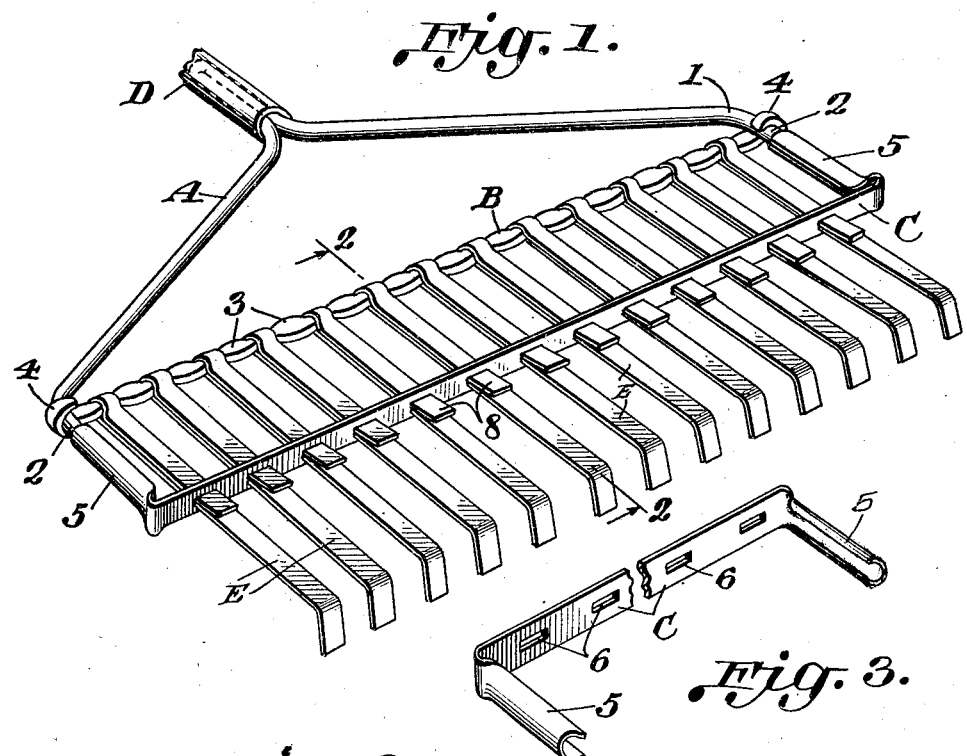
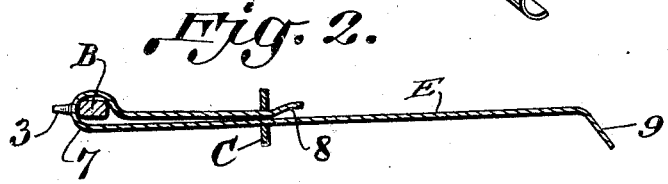
Inventor
Camille J. Rocquin
by his Attorneys
Baldwin & Wight Patented Dec. 16, 1930

1,784,947

UNITED STATES PATENT OFFICE

CAMILLE J. ROCQUIN, OF NEW ORLEANS, LOUISIANA

RAKE

Application filed December 20, 1927. Serial No. 241,384.

This invention has for its purpose the construction of a rake for garden or similar use which can be manufactured from a very small number of parts of simple construction, but which will be efficient and durable. Provision is also made whereby separate tines may be replaced if they become broken. Detailed features of the invention will be apparent from the following description and appended claims.

In the drawings:

Figure 1 is a perspective view of the rake.

Figure 2 is a cross section on the line 2—2 of Figure 1.

Figure 3 is a perspective view of the front member of the frame.

Figure 4 is a top plan view on an enlarged scale of a portion of the rear member of the frame.

Figure 5 is a cross section on the line 5—5 of Figure 4.

Figure 6 is a cross section on the line 6—6 of Figure 4.

The rake herein illustrated is composed of three main elements: sides A, a rear cross bar B, and a front cross bar C, and a plurality of forwardly extending spaced tines E. The member A is perferably formed of a single rod which has a bend in the middle thereof which may be inserted into a conventional form of handle D or may be affixed to a handle in the manner shown in my prior application 187,461, filed April 29, 1927, or in my application Serial No. 241,385 filed December 20, 1927. The rod forming the member A is bent at 1 to provide substantially parallel side arms 2 at the ends thereof. The rear cross bar B is in the form of a rod or bar having deformed portions 3 forming a plurality of longitudinally spaced reduced portions and having its ends 4 bent over the sides 2 tightly enough to prevent accidental displacement.

The front cross bar C is preferably a sheet metal strip having its ends formed into rearwardly extending arms 5 of split tubular form adapted to telescopically fit around and frictionally engage the side arms 2. This sheet metal member is provided with a plurality of longitudinally spaced openings 6. It will be noted that the side arms 2 and the rearwardly extending arms 5 conjointly form a support for the front and rear cross bars.

Each tine is formed of a springy strip of sheet metal and intermediate its ends is bent at 7 about a reduced portion of the rear member B, and these bends lie between the deformed portions 3, which prevent sidewise displacement of the rear end of the tine. The tine may be extended forward and have its short end passed through the corresponding opening 6, as shown at 8, above the body of the tine. The outer ends of the tines are preferably bent to form teeth 9.

It is obvious that the frame is constructed in a very simple manner of metal parts and can be assembled quickly by the use of proper tools. While the tines are held against accidental displacement in any direction, nevertheless a broken tine can be removed and a new one inserted to take its place. All portions of the rake are made of metal and can be painted or otherwise protected against atmospheric or other corrosive influences. It is obvious that minor detail changes may be made without in any way departing from the spirit of the invention, which is to be regarded as limited only by the scope of the appended claims.

I claim as my invention:

1. In a rake, the combination with a support, of spaced front and rear cross bars connected thereto, said rear cross bar being provided with a plurality of spaced reduced portions; and a plurality of spaced, forwardly extending tines having their rear ends connected to the reduced portions of the rear cross bar and having their intermediate portions connected with said front cross bar.

2. In a rake, the combination with a support, of spaced front and rear cross bars connected thereto, said rear cross bar being provided with a plurality of spaced reduced portions; said front cross bar being provided with a plurality of spaced openings; and a plurality of spaced, forwardly extending tines having their rear ends connected to the reduced portions of the rear cross bar and having their intermediate portions extending through the openings of the front cross bar.

3. In a rake, the combination with a support, of spaced front and rear cross bars connected thereto, said rear cross bar being provided with a plurality of spaced reduced portions; and a plurality of spaced, forwardly extending tines connected to said front cross bar and having their rear ends bent around the reduced portions of the rear cross bar.

4. In a rake, the combination with a support, of spaced front and rear cross bars connected thereto, said rear cross bar being provided with a plurality of spaced reduced portions, said front cross bar being provided with a plurality of spaced openings, and a plurality of spaced forwardly extending tines connected to said cross bars, the intermediate portions of said tines passing through the respective openings in said front cross bar and the rear end portions of the tines being bent around the reduced portions of said rear cross bar and extending into the respective corresponding openings in said front cross bar.

In testimony whereof, I have hereunto subscribed my name.

CAMILLE J. ROCQUIN.